(12) United States Patent
Liu et al.

(10) Patent No.: US 10,518,219 B2
(45) Date of Patent: Dec. 31, 2019

(54) ION-EXCHANGE PROCESS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Zhongqing Liu, Beijing (CN); Lina Zhou, Beijing (CN); Yibin Luo, Beijing (CN); Xingtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 318 days.

(21) Appl. No.: 15/490,549

(22) Filed: Apr. 18, 2017

(65) Prior Publication Data
US 2017/0296971 A1   Oct. 19, 2017

Related U.S. Application Data

(60) Provisional application No. 62/324,503, filed on Apr. 19, 2016.

(51) Int. Cl.
*B01D 61/44* (2006.01)
*B01D 61/58* (2006.01)
(Continued)

(52) U.S. Cl.
CPC .......... *B01D 61/445* (2013.01); *B01D 61/58* (2013.01); *C01B 39/026* (2013.01); *C01B 39/38* (2013.01);
(Continued)

(58) Field of Classification Search
CPC .................. B01D 61/445; C01B 39/00–54
See application file for complete search history.

(56) References Cited

U.S. PATENT DOCUMENTS

| | | | |
|---|---|---|---|
| 2002/0113015 A1* | 8/2002 | Carati | ............ B01J 29/06 210/638 |
| 2008/0253959 A1* | 10/2008 | Johnson | ............ C01B 37/00 423/702 |

(Continued)

FOREIGN PATENT DOCUMENTS

| | | | |
|---|---|---|---|
| CN | 103768951 A | 5/2014 | |
| WO | WO-2014000422 A1 * | 1/2014 | ......... C01B 39/24 |

*Primary Examiner* — Steven A. Friday
(74) *Attorney, Agent, or Firm* — Novick, Kim & Lee, PLLC; Allen Xue

(57) ABSTRACT

A process for ion-exchanging an exchangeable-ion containing solid material, characterized in that said process include a bipolar membrane electrodialysis step, which comprises subjecting an aqueous ion-containing solution to a bipolar membrane electrodialysis to produce an acid liquid; an ion-exchange step, which comprises contacting the exchangeable-ion containing solid material with the acid liquid and conducting the ion-exchange to produce a slurry containing the ion-exchanged solid material; a solid-liquid separation step, which comprises subjecting the slurry containing the ion-exchanged solid material to a solid-liquid separation to produce a solid phase and a liquid phase, adjusting the liquid phase to a pH of 4-6.5, and subjecting the pH-adjusted liquid phase to a solid-liquid separation to produce a treatment liquid. Oxalic acid is used in at least one of the bipolar membrane electrodialysis step, the ion-exchange step, and the solid-liquid separation step.

18 Claims, 2 Drawing Sheets

(51) Int. Cl.
*C01B 39/02* (2006.01)
*C01B 39/38* (2006.01)
*B01D 61/14* (2006.01)

(52) U.S. Cl.
CPC .... *B01D 61/145* (2013.01); *B01D 2311/2623* (2013.01)

(56) References Cited

U.S. PATENT DOCUMENTS

| | | | |
|---|---|---|---|
| 2011/0203929 A1* | 8/2011 | Buckley | B01D 61/445 204/537 |
| 2015/0158025 A1* | 6/2015 | Zheng | C01B 39/24 423/713 |

* cited by examiner

ION-EXCHANGE PROCESS

TECHNICAL FIELD

The present invention relates to a process for ion-exchanging an exchangeable-ion containing solid material, and in particular to a process for a process for ion-exchanging an exchangeable-ion containing solid material in a clean and low-cost manner.

BACKGROUND

The present invention is an improvement to the molecular sieve ion-exchange process disclosed in the Chinese patent application CN103768951A.

The Chinese patent application CN103768951A specifically disclosed a molecular sieve ion-exchange process, which comprises: mixing a molecular sieve starting material and water to produce a first slurry; filtering the first slurry to produce a second liquid and a second solid (filter cake); mixing the second liquid and the ionic compound to produce an aqueous ion-containing solution; adjusting the aqueous solution with a basic substance to a pH of higher than 8 and then conducting a solid-liquid separation, and subjecting the resulting liquid phase to a bipolar membrane electrodialysis to produce an acid liquid; ion-exchanging at least a part of the second solid (filter cake) and the acid liquid in an ion-exchange vessel; filtering a mixture obtained from the ion-exchange to produce a first liquid (being acidic) and a first solid (filter cake); treating the first solid (filter cake) to produce an ion-exchanged molecular sieve; and adjusting the first liquid with a basic substance to a pH of higher than 8 and then conducting a solid-liquid separation, and subjecting the resulting liquid phase (an aqueous ion-containing solution) to a bipolar membrane electrodialysis to produce an acid liquid for the use in the ion-exchange.

CN103768951A proposed it is necessary to adjust the first liquid to a pH of higher than 8 before the bipolar membrane electrodialysis.

SUMMARY OF THE INVENTION

The present inventors have surprisingly found that, during the ion-exchange of the exchangeable-ion containing solid material (e.g., molecular sieve) in which a bipolar membrane electrodialysis device is used, a lower energy consumption in the bipolar membrane electrodialysis step and a higher ion-exchange efficiency can be achieved by oxalic acid existing in the liquid phase obtained from the ion-exchange step and controlling said liquid phase to a pH of 4-6.5.

The present invention provides the following technical solutions:

1. A process for ion-exchanging an exchangeable-ion containing solid material, characterized in that said process comprises: a bipolar membrane electrodialysis step, which comprises subjecting an aqueous ion-containing solution to a bipolar membrane electrodialysis to produce an acid liquid; an ion-exchange step, which comprises contacting the exchangeable-ion containing solid material with the acid liquid and conducting the ion-exchange to produce a slurry containing the ion-exchanged solid material; a solid-liquid separation step, which comprises subjecting the slurry containing the ion-exchanged solid material to a solid-liquid separation to produce a solid phase (also referred to as "first solid" herein) and a liquid phase (also referred to as "first liquid" herein), adjusting the liquid phase to a pH of 4-6.5, and subjecting the pH-adjusted liquid phase to a solid-liquid separation to produce a treatment liquid; wherein the treatment liquid can replace at least a part of the aqueous ion-containing solution in the bipolar membrane electrodialysis step; wherein the aqueous ion-containing solution has an anion concentration or a cation concentration of 0.01-10 mol/L; wherein oxalic acid exists in at least one of the bipolar membrane electrodialysis step, the ion-exchange step, and the solid-liquid separation step.

2. The process according to any of the foregoing technical solution(s), wherein the aqueous ion-containing solution is an aqueous ion-containing solution obtained by washing the exchangeable-ion containing solid material with water, then adding to the resulting water-washing liquid (also referred to as "second liquid" herein) an ionic compound and oxalic acid (wherein the g/kg weight ratio of oxalic acid to the exchangeable-ion containing solid material is 0.1-10), adjusting the resulting mixture to a pH of 4-6.5 and filtering the pH-adjusted mixture.

3. The process according to any of the foregoing technical solution(s), wherein the exchangeable ion in the exchangeable-ion containing solid material comprises one or more of $Ca^{2+}$, $Mg^{2+}$, $Fe^{3+}$, $Al^{3+}$, $Si^{4+}$ and rare earth metal (e.g., lanthanum and/or cerium) ions.

4. The process according to any of the foregoing technical solution(s), wherein the bipolar membrane electrodialysis step, the ion-exchange step and the solid-liquid separation step are cyclically conducted, and the treatment liquid replaces at least a part of or all of the aqueous ion-containing solution in the bipolar membrane electrodialysis step.

5. The process according to any of the foregoing technical solution(s), wherein relative to the weight of the exchangeable-ion containing solid material, the used amount of oxalic acid is 0.1-10 g/kg, for example 0.5-5 g/kg, such as 0.5-2 g/kg.

6. The process according to any of the foregoing technical solution(s), wherein the liquid phase (also referred to as "first liquid" herein) contains oxalic acid.

7. The process according to any of the foregoing technical solution(s), characterized in that said process comprises:
(1) mixing an exchangeable-ion containing solid material and water to produce a first slurry;
(2) subjecting the first slurry to a solid-liquid separation to produce a second liquid and a second solid;
(3) contacting the second liquid with an ionic compound and oxalic acid to produce an aqueous ion-containing solution and controlling the aqueous ion-containing solution to a pH of 4-6.5, and then subjecting the pH-controlled solution to a solid-liquid separation to produce a treatment liquid, and subjecting the resulting treatment liquid to a bipolar membrane electrodialysis to produce an acid liquid;
(4) ion-exchanging at least a part of the second solid with the resulting acid liquid in an ion-exchange vessel to produce a slurry containing the ion-exchanged solid material, then subjecting the resulting slurry containing the ion-exchanged solid material to a solid-liquid separation to produce a first liquid and a first solid, and treating the first solid to produce a finished product or sending the first solid back to the ion-exchange vessel for a further ion-exchange;
(5) adjusting the first liquid with a basic substance to a pH of 4-6.5, then subjecting the pH-adjusted first liquid to a solid-liquid separation to produce another treatment liquid, and subjecting the resulting treatment liquid to a bipolar membrane electrodialysis to produce an acid liquid;
(6) repeating the steps (4) and (5) for one or more times;
wherein the aqueous ion-containing solution has an anion concentration or a cation concentration of 0.01-10 mol/L, wherein relative to the weight of the exchangeable-ion containing solid material, the used amount of oxalic acid is 0.1-10 g/kg, e.g. 0.5-5 g/kg, 0.5-2 g/kg.

8. The process according to any of the foregoing technical solution(s), wherein the exchangeable-ion containing solid material is a molecular sieve.

9. The process according to any of the foregoing technical solution(s), wherein the exchangeable-ion containing solid material is a molecular sieve containing at least one template agent.

10. The process according to any of the foregoing technical solution(s), wherein the bipolar membrane electrodialysis is conducted in a bipolar membrane electrodialysis device, the bipolar membrane electrodialysis device comprises an anode, a cathode, at least two bipolar membranes between the anode and the cathode, at least one cation exchange membrane and at least one anion exchange membrane, wherein the cation exchange membrane and the anion exchange membrane in pairs separate each two bipolar membranes from each other.

11. The process according to any of the foregoing technical solution(s), wherein the exchangeable-ion containing solid material is selected from the group consisting of ZSM-5-molecular sieve, REUSY-molecular sieve, NaY-molecular sieve, Beta-molecular sieve and MCM-22-molecular sieve.

12. The process according to any of the foregoing technical solution(s), wherein the exchangeable-ion containing solid material is a molecular sieve having a $Na_2O$ content of 0.1-20 wt %, preferably 1-15 wt %.

13. The process according to any of the foregoing technical solution(s), wherein the exchangeable-ion containing solid material is a molecular sieve having a relative crystallinity of 50-99%, preferably 58%-97%.

14. The process according to any of the foregoing technical solution(s), wherein the liquid phase is adjusted with a basic substance to a pH of 4-6.5.

15. The process according to any of the foregoing technical solution(s), wherein the ionic compound is one or more of sodium sulphate, sodium nitrate, sodium phosphate, sodium hydrogen phosphate, sodium dihydrogen phosphate, potassium nitrate, potassium phosphate, potassium hydrogen phosphate, potassium dihydrogen phosphate, sodium formate, potassium formate and quaternary ammonium compounds.

DETAILED DESCRIPTION

The present invention is an improvement to the Chinese patent application CN103768951A, and the whole disclosure of the Chinese patent application CN103768951A are incorporated herein as reference.

The present invention provides a process for ion-exchanging an exchangeable-ion containing solid material, which process comprises: a bipolar membrane electrodialysis step, an ion-exchange step, and a solid-liquid separation step. According to the present invention, the bipolar membrane electrodialysis, the ion-exchange and the solid-liquid separation can be conducted in the devices known in the art. For example, according to the present invention, the bipolar membrane electrodialysis, the ion-exchange and the solid-liquid separation can be conducted in the devices as described in the Chinese patent application CN103768951A.

Bipolar Membrane Electrodialysis Step

This step comprises subjecting an aqueous ion-containing solution to a bipolar membrane electrodialysis to produce an/the acid liquid.

According to the present invention, the source for the aqueous ion-containing solution is not particularly limited. For example, the aqueous ion-containing solution can be an aqueous solution obtained by dissolving an ionic compound in water. According to the present invention, the ionic compound can be those well known to a person skilled in the art. Generally, the ionic compound can be an inorganic ionic compound and/or an organic ionic compound. The inorganic ionic compound can be one or more of sodium sulphate, sodium nitrate, sodium phosphate, sodium hydrogen phosphate, sodium dihydrogen phosphate, potassium nitrate, potassium phosphate, potassium hydrogen phosphate and potassium dihydrogen phosphate. The organic ionic compound can be one or more of sodium formate, potassium formate and quaternary ammonium compounds (tetramethylammonium chloride, tetramethylammonium bromide and tetramethylammonium hydroxide).

Generally, the aqueous ion-containing solution can have an anion concentration or a cation concentration of 0.01-10 mol/L, 0.01-8 mol/L, 0.01-1 mol/L, or 0.02-0.2 mol/L.

Figure 2:
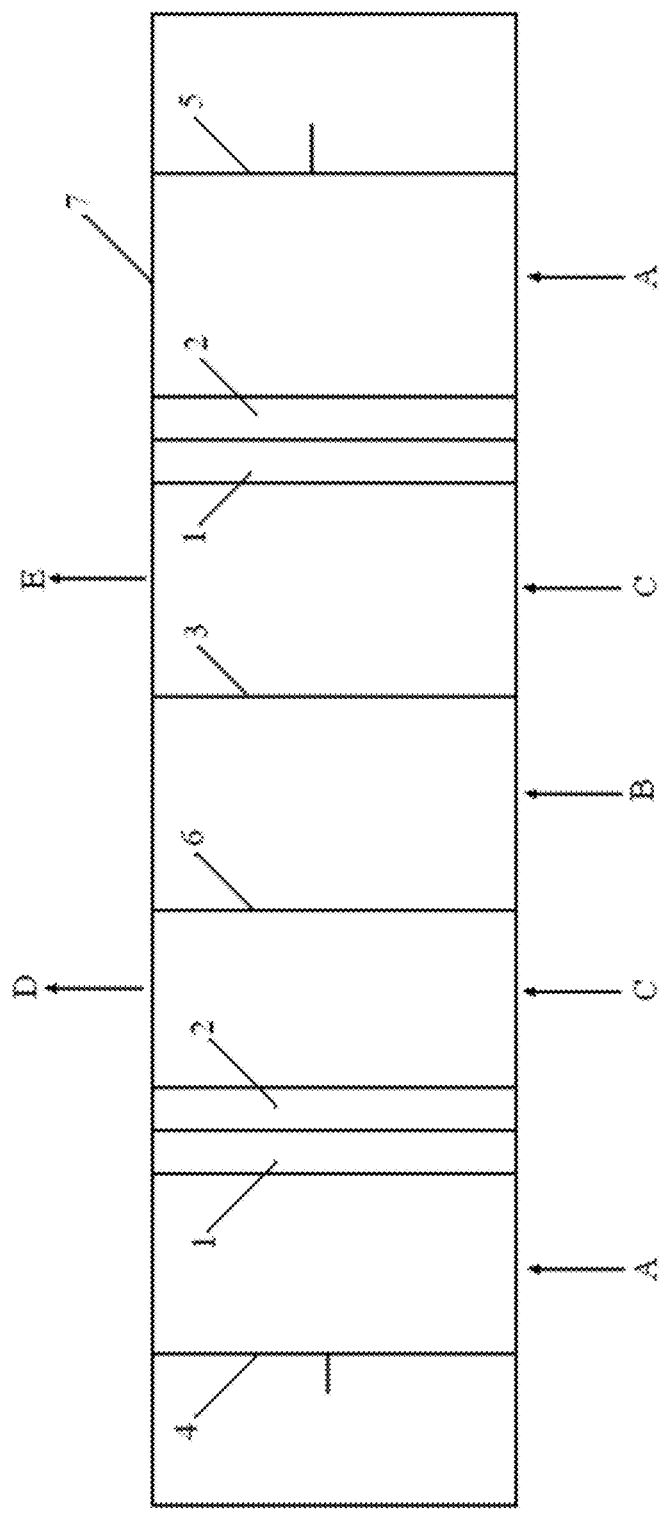
FIG. 2 shows an arrangement of membrane stack and electrodes in the bipolar membrane electrodialysis device suitable for being used in the process according to the present invention.

According to the present invention, the used bipolar membrane electrodialysis method is not particularly limited. For example, the bipolar membrane electrodialysis can be performed in the arrangement of membrane stack and electrodes of the bipolar membrane electrodialysis device as shown in FIG. 2. In said arrangement, the bipolar membrane electrodialysis device comprises, in an electrode frame 7, an anode 4, a cathode 5, at least two bipolar membranes between the anode 4 and the cathode 5, at least one cation exchange membrane 3 and at least one anion exchange membrane 6, and the cation exchange membrane 3 and the anion exchange membrane 6 in pairs separate each two bipolar membranes from each other. An aqueous ion-containing solution B flows into a salt chamber between the cation exchange membrane 3 and the anion exchange membrane 6; water C flows into an acid chamber between a cation exchange layer 2 of the bipolar membrane and the anion exchange membrane 6 and a base chamber between an anion exchange layer 1 of the bipolar membrane and the cation exchange membrane 3; an aqueous electrolyte solution A is filled in an electrode chamber between the anode 4 and the anion exchange layer 1 of the bipolar membrane and an electrode chamber between the cathode 5 and the cation exchange layer 2 of the bipolar membrane; a direct current is applied to electrodes 4 and 5, and an acid liquid D is formed in the acid chamber and a base liquid E is formed in the base chamber.

According to the present invention, there is not any particular limitation to the ratio of the electrolyte to water in the aqueous electrolyte solution filled in the electrode chamber. Generally, in the aqueous electrolyte solution, the weight ratio of the electrolyte to water can be 0.001-1:1, 0.001-0.5:1, 0.005-0.2:1, or 0.01-0.05:1. The electrolyte in the aqueous electrolyte solution can be those conventionally used in the art, and include an inorganic electrolyte and/or an organic electrolyte. The inorganic electrolyte can be one or more of sodium sulphate, sodium nitrate, sodium phosphate, sodium hydrogen phosphate, sodium dihydrogen phosphate, potassium nitrate, potassium phosphate, potassium hydrogen phosphate, potassium dihydrogen phosphate, sodium hydroxide and potassium hydroxide, and the organic electrolyte can be one or more of sodium formate, potassium formate and quaternary ammonium compounds (tetramethylammonium chloride, tetramethylammonium bromide and tetramethylammonium hydroxide).

The specific operation conditions of the bipolar membrane electrodialysis are well known by a person skilled in the art. Generally, the voltage applied across one membrane unit can be 0.5-6V or 1-5V; and the temperature of the aqueous ion-containing solution can be 0-100° C., 5-80° C., or 10-60° C.

Ion-Exchange Step

This step comprises contacting the exchangeable-ion containing solid material with the acid liquid and conducting the ion-exchange to produce a slurry containing the ion-exchanged solid material.

According to the present invention, the exchangeable-ion containing solid material can be one or more of a molecular sieve, a cation exchange resin, an amphoteric ion-exchange resin and a gel.

The molecular sieve can be selected from a group consisting of Y-molecular sieve (e.g. REUSY-molecular sieve, NaY-molecular sieve), X-molecular sieve, A-molecular sieve, L-molecular sieve, Beta-molecular sieve, FER-molecular sieve, MOR-molecular sieve, ZSM-5-molecular sieve, ZSM-22-molecular sieve, ZSM-11-molecular sieve, ZSM-23-molecular sieve, ZSM-35-molecular sieve, MCM-22-molecular sieve, MCM-49-molecular sieve, MCM-36-molecular sieve, MCM-56-molecular sieve, MCM-41-molecular sieve, MCM-48-molecular sieve, MCM-50-molecular sieve, SBA-15-molecular sieve, SBA-16-molecular sieve, MSU-1-molecular sieve, MSU-2-molecular sieve, SAPO-34-molecular sieve, SAPO-11-molecular sieve, SAPO-5-molecular sieve, SAPO-18-molecular sieve, APO-5-molecular sieve, APO-11-molecular sieve, and MeAPO-11-molecular sieve.

The gel can be those well known to a person skilled in the art, including a silica-alumina gel, a silica-titania gel, a silicon-boron gel, a zinc-aluminum gel, an aluminum-magnesium gel, or a combination thereof.

According to the present invention, the molecular sieve can be a molecular sieve containing a template agent. The molecular sieve containing a template agent can be those well known to a person skilled in the art. Specifically, the molecular sieve containing a template agent can be selected from the group consisting of Beta-molecular sieve, FER-molecular sieve, MOR-molecular sieve, ZSM-5-molecular sieve, ZSM-22-molecular sieve, ZSM-11-molecular sieve, ZSM-23-molecular sieve, ZSM-35-molecular sieve, MCM-22-molecular sieve, MCM-49-molecular sieve, MCM-36-molecular sieve, MCM-56-molecular sieve, SAPO-34-molecular sieve, SAPO-11-molecular sieve, SAPO-5-molecular sieve, SAPO-18-molecular sieve, APO-5-molecular sieve, APO-11-molecular sieve, MeAPO-11-molecular sieve, MCM-41-molecular sieve, MCM-48-molecular sieve, MCM-50-molecular sieve, SBA-15-molecular sieve, SBA-16-molecular sieve, MSU-1-molecular sieve and MSU-2-molecular sieve.

The template agent can be those conventionally used in the molecular sieve synthesis in the art, for example, an organic amine and/or a quaternary ammonium base. The specific example of the template agent can include but be not limited to one or more of methylamine, dimethylamine, trimethyllamine, tetramethylammonium chloride, tetramethylammonium bromide, tetramethylammonium iodide, tetramethylammonium hydroxide, ethylamine, diethylamine, triethylamine, tetraethylammonium chloride, tetraethylammonium bromide, tetraethylammonium iodide, n-propylamine, iso-propylamine, di-n-propylamine, di-iso-propylamine, tri-n-propylamine, tri-iso-propylamine, tetrapropylammonium chloride, tetrapropylammonium bromide, tetrapropylammonium iodide, tetrapropylammonium hydroxide, cetyltrimethylammonium chloride, cetyltrimethylammonium bromide, cetyltrimethylammonium iodide, cetyltrimethylammonium hydroxide, hexamethyleneimine, hexamethylenediamine, ethylenediamine, tetraethylammonium hydroxide and tetra butylammonium hydroxide.

In one embodiment, the exchangeable-ion containing solid material can be selected from the group consisting of ZSM-5-molecular sieve, REUSY-molecular sieve, NaY-molecular sieve, Beta-molecular sieve, MCM-22-molecular sieve and a combination thereof.

The ion-exchange can be performed in an ion-exchange device. There is not any particular limitation to the device for the ion-exchange.

According to the present invention, the condition for the ion-exchange is also not particularly limited. Generally, the temperature for the ion-exchange can be 0-100° C., 5-80° C., or 10-60° C.

Solid-Liquid Separation Step

This step comprises subjecting the slurry containing the ion-exchanged solid material to a solid-liquid separation to produce a solid phase (also referred to as "first solid" herein) and a liquid phase (also referred to as "first liquid" herein), adjusting the liquid phase to a pH of 4-6.5, and subjecting the pH-adjusted liquid phase to a solid-liquid separation to produce a treatment liquid.

The solid-liquid separation can be decantation, filtration, or a combination therefore, preferably filtration, more preferably ultrafiltration.

The first solid obtained from the solid-liquid separation can be a final product, or can be an intermediate product to be further ion-exchanged. In case that the first solid is the intermediate product to be further ion-exchanged, the first solid may contain water. In the first solid, the weight ratio of the solid to water can be 1:0.5-10, 1:0.5-5, or 1:1-3. The weight ratio of the solid to water in the first solid can be controlled by adjusting the condition of the solid-liquid separation and/or supplementing the water. Preferably, the weight ratio of the solid to water in the first solid is controlled by adjusting the condition of the solid-liquid separation.

According to the present invention, the first liquid is adjusted to a pH of 4-6.5, and then subjected to a solid-liquid separation to produce a treatment liquid, and the treatment liquid is used as the aqueous ion-containing solution in the bipolar membrane electrodialysis step to produce an acid liquid.

According to the present invention, the method of adjusting the pH of the first liquid is not particularly limited, and can be conventionally conducted. For example, a basic substance can be added to the first liquid so as to adjust the first liquid to a pH of 4-6.5. The basic substance can be any basic substance conventionally used for the pH adjustment in the art. Preferably, the basic substance is a hydroxide of alkali metal (e.g., sodium hydroxide and/or potassium hydroxide) or aqueous ammonia. More preferably, the basic substance is aqueous ammonia. According to the present invention, the concentration of aqueous ammonia is not particularly limited. Generally, the concentration of aqueous ammonia is not higher than 35 wt %, e.g. 10 wt %-28 wt %, such as 10 wt %, 17 wt %, 20 wt %, 25 wt %, or 28 wt %.

Figure 1:
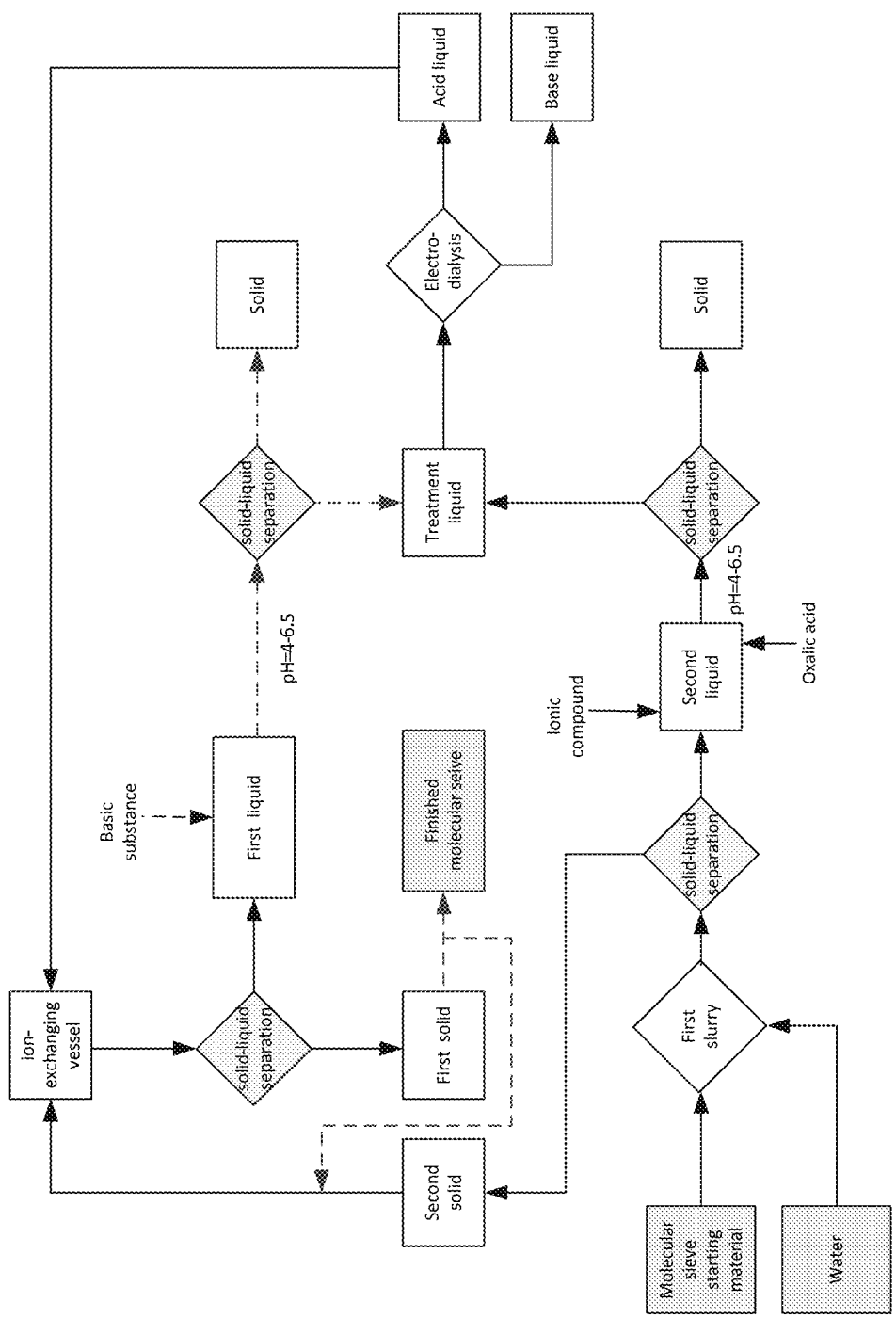
FIG. 1 shows a process chart for removing Na from a Na-molecular sieve with the process according to the present invention.

FIG. 1 shows a process chart for removing Na from a Na-molecular sieve with the process according to the present invention. As shown in FIG. 1, Na-molecular sieve is mixed with water to produce a first slurry; the first slurry is subjected to a solid-liquid separation to produce a second liquid and a second solid; the second liquid is mixed with an ionic compound and oxalic acid to produce an aqueous ion-containing solution; the resulting aqueous ion-containing solution is adjusted to a pH of 4-6.5 and then subjected to a solid-liquid separation to produce a treatment liquid; the resulting treatment liquid is subjected to a bipolar membrane electrodialysis to produce an acid liquid for ion-exchange; at least a part of the second solid is ion-exchanged with the resulting acid liquid in an ion-exchange vessel, and the resulting mixture after the ion-exchange is subjected to a solid-liquid separation to produce a first liquid and a first solid; the first solid can be treated to produce a finished molecular sieve or the first solid can be sent to the ion-exchange vessel for a further ion-exchange; the first liquid is adjusted with a basic substance to a pH of 4-6.5, then the pH-adjusted first liquid is subjected to a solid-liquid separation to produce another treatment liquid, and the resulting treatment liquid is subjected to a bipolar membrane electrodialysis to produce the acid liquid for ion-exchange.

According to the present invention, the bipolar membrane electrodialysis step, the ion-exchange step and the solid-liquid separation step can be cyclically conducted for two or more times, so that the ion-exchange of the exchangeable-ion containing solid material can be conducted for two or more times.

During the ion-exchange step, the exchangeable cationic group in the solid material is ion-exchanged with the hydrogen ion in the acid liquid, and the anion in the acid liquid does not take part in the ion-exchange and remains in the first liquid. Accordingly, even if no ionic compound is supplemented, the resulting treatment liquid can be recycled to the bipolar membrane electrodialysis step. It can be understood by a person skilled in the art that, when it is desirable to further increase the concentration of the acid liquid or when the ion content in the treatment liquid is not sufficient, the ionic compound can be supplemented to the treatment liquid to increase the anion concentration or the cation concentration. Additionally, when the amount of the treatment liquid is insufficient, water or an aqueous solution of ionic compound can be supplemented to the treatment liquid. The ionic compound can be an inorganic ionic compound and/or an organic ionic compound. The inorganic ionic compound can be one or more of sodium sulphate, sodium nitrate, sodium phosphate, sodium hydrogen phosphate, sodium dihydrogen phosphate, potassium nitrate, potassium phosphate, potassium hydrogen phosphate and potassium dihydrogen phosphate. The organic ionic compound can be one or more of sodium formate, potassium formate and quaternary ammonium compounds (tetramethylammonium chloride, tetramethylammonium bromide and tetramethylammonium hydroxide). The ionic compound can be used in such an amount that the cation concentration or the anion concentration in the treatment liquid satisfies the requirement for the cation concentration or the anion concentration in the aqueous ion-containing solution, as discussed hereinabove.

Oxalic Acid

Compared to CN103768951A, the improvement of the invention lies in that oxalic acid exists in at least one of the bipolar membrane electrodialysis step, the ion-exchange step, and the solid-liquid separation step, or in other words, the process of the present invention is conducted in presence of oxalic acid, so that a lower energy consumption in the bipolar membrane electrodialysis step and a higher ion-exchange efficiency can be achieved. In one embodiment of the present invention, oxalic acid exists in a liquid phase obtained from the ion-exchange step, and said liquid phase is controlled to a pH of 4-6.5, e.g. 4.5-6.3. Furthermore, compared to CN103768951A, since the liquid phase obtained from the ion-exchange step is in an acidic state, the used amount of the basic substance can be remarkably reduced by controlling the pH in an acidic range.

The used oxalic acid can be in a solid form or in a liquid form, preferably in a liquid form, more preferably in form of an aqueous oxalic acid liquid. According to the present invention, there is not any particular limitation to the concentration of the aqueous oxalic acid liquid. Generally, the concentration of the aqueous oxalic acid liquid is 5-50 wt %, 10-40 wt %, 15-35%, or 20-30 wt %.

According to the present invention, the used amount of oxalic acid is relevant to the amount of the exchangeable-ion containing solid material to be ion-exchanged. Generally, the ratio (g/kg) of the used amount of oxalic acid to the amount of the exchangeable-ion containing solid material to be ion-exchanged can be 0.001-1000, 0.01-100, or 0.1-10, e.g. 0.5-5, such as 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0.

According to the present invention, it is necessary that oxalic acid exists in the liquid phase obtained from the ion-exchange step at least before the bipolar membrane electrodialysis is performed. Controlling the liquid phase obtained from the ion-exchange step at a pH level of 4-6.5 can be achieved by adding a base to the liquid phase.

Oxalic acid existing in at least one of the bipolar membrane electrodialysis step, the ion-exchange step, and the solid-liquid separation step or the process of the present invention being conducted in presence of oxalic acid can be accomplished through the following manners: oxalic acid can be added to the acid liquid before the ion-exchange step, or oxalic acid is added to the ion-exchange vessel during the ion-exchange step, or oxalic acid is added the slurry containing the ion-exchanged solid material after the ion-exchange step, or oxalic acid is added to the liquid phase obtained from the solid-liquid separation step, or oxalic acid is added to the aqueous ion-containing solution to be sent to the bipolar membrane electrodialysis step, or oxalic acid is added upon formulating the aqueous ion-containing solution to be sent to the bipolar membrane electrodialysis step, or a combination thereof. For convenience, oxalic acid is added in the start-up period, that is to say, an exchangeable-ion containing solid material (e.g. a molecular sieve starting material) is mixed with water to produce a first slurry; the first slurry is subjected to a solid-liquid separation to produce a second liquid and a second solid; the second liquid is contacted with an ionic compound and oxalic acid to produce an aqueous ion-containing solution; the resulting aqueous ion-containing solution is adjusted to a pH of 4-6.5 and then subjected to a solid-liquid separation to produce a treatment liquid to be used in the following bipolar membrane electrodialysis.

According to the present invention, when the first liquid is cycled to the bipolar membrane electrodialysis step to conduct the bipolar membrane electrodialysis, not only an acid liquid can be obtained, but also a base liquid can be obtained. In case that a molecular sieve containing a template agent is ion-exchanged with an acid liquid, at least a part of the template agent in the molecular sieve can be removed from the molecular sieve and come into the first liquid obtained from the solid-liquid separation step and subsequently into the resulting treatment liquid. When the treatment liquid containing a template agent is subjected to the bipolar membrane electrodialysis, a cation moiety and an anion moiety are formed from the template agent under the action of electric field. The cation moiety migrates into the base chamber and combines with OH⁻ formed during the bipolar membrane electrodialysis to form a base so that the template agent can be recovered.

According to the present invention, in case that the molecular sieve is a Na-molecular sieve containing a template agent, the bipolar membrane electrodialysis of the treatment liquid derived from the first liquid not only produces an acid liquid to be used in the ion-exchange, but also produces a base liquid, which is an aqueous solution containing the template agent and NaOH and substantially free of other solutes. Therefore, the base liquid can be directly used as the starting material for preparing the molecular sieve.

Accordingly, the present invention also provides the use of a base liquid in the preparation of the molecular sieve, wherein the base liquid is obtained from the molecular sieve ion-exchange process of the present invention, and the molecular sieve is a Na-molecular sieve containing a template agent.

The ion-exchange process of the present invention can not only remarkably reduce the energy consumption of the bipolar membrane electrodialysis device and extend the use life of the ion-exchange membrane, but also can achieve a higher ion-exchange efficiency.

The process of the present invention is particularly suitable for ion-exchanging the molecular sieve, in particular the Na-molecular sieve.

The effect of the present invention will be further demonstrated through the following examples. It should be understood that the scope of the present invention is not limited by the following examples.

In the Examples and Comparative Examples, the molecular sieve starting materials were commercially available from Sinopec Catalyst Company, Qilu Division.

In the following examples and comparative examples, the ion content of the molecular sieve was determined with X-ray fluorescence spectrometry (XRF). The XRF measurement was conducted with Rigaku 3271E X-ray fluorescence spectrometer.

In the following examples and comparative examples, the relative crystallinity of the molecular sieve was determined according to Analytical Methods in Petrochemical Industry (RIPP Experiment Techniques), Yang Cuiding et. al, Science Press, 1990. p. 414-415.

In the following examples and comparative examples, the used bipolar membrane electrodialysis device was the ACI-LYZER-02 electrodialysis device (Alstom Japan, the membrane stack size was 100×400 mm), the bipolar membrane was commercially available from Alstom Japan (model BP-1), the cation exchange membrane was commercially available from Shanghai Chemical Plant (model 3362-BW), the anion exchange membrane was commercially available from Shanghai Chemical Plant (model 3361-BW). In the following examples and comparative examples, 5000 mL beakers were used as the ion-exchange vessel.

In the following examples and comparative examples, the ion content of the solution was determined by inductively coupled plasma atomic emission spectrometry (ICP-AES).

In the following examples and comparative examples, the electrodialysis electric current was determined with the avometer.

In the following examples and comparative examples, the bipolar membrane electrodialysis was conducted in a bipolar membrane electrodialysis device, as showed in FIG. 2, wherein the bipolar membrane electrodialysis device had 40 bipolar membranes, 20 cation exchange membranes and 20 anion exchange membranes.

Example 1

(1) 10 kg of REUSY-molecular sieve (having a $Na_2O$ content of 4.96 wt % and a relative crystallinity of 58%) was added to 130 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 800 g of $Na_2SO_4$ were mixed evenly to produce an aqueous ion-containing solution. The aqueous solution was adjusted to a pH of 5.6 with oxalic acid (20 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (2 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 60V. The electrodialysis was run at 30° C. for 30 minutes.

(3) The acid liquid obtained from the acid chamber was added to an ion-exchange vessel, and the filter cake obtained in step (1) was ion-exchanged with the acid liquid at 30° C. for 35 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (17 wt %), and the resulting filtrate was adjusted to a pH of 5.6 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 44 A. The current intensity at the initial stage of the electrodialysis for the last run was 44 A. After 30 minutes, the current intensity of the electrodialysis for the first run was 28 A, and the current intensity of the electrodialysis for the last run was 27 A. In this example, the weight ratio (g/kg) of oxalic acid to the molecular sieve starting material is 0.9.

Comparative Example 1

(1) 10 kg of REUSY-molecular sieve (having a $Na_2O$ content of 4.96 wt % and a relative crystallinity of 58%) was added to 130 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 800 g of $Na_2SO_4$ were mixed evenly to produce an aqueous ion-containing solution. The aqueous solution was adjusted to a pH of 12.5 with aqueous ammonia (17 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (2 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 60V. The electrodialysis was run at 30° C. for 30 minutes.

(3) The acid liquid obtained from the acid chamber was added to an ion-exchange vessel, and the filter cake obtained in step (1) was ion-exchanged with the acid liquid at 30° C. for 35 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (17 wt %), and the resulting filtrate was adjusted to a pH of 11 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 42 A. The current intensity at the initial stage of the electrodialysis for the last run was 42 A. After 30 minutes, the current intensity of the electrodialysis for the first run was 14 A, and the current intensity of the electrodialysis for the last run was 13 A.

Example 2

(1) 10 kg of NaY-molecular sieve (having a $Na_2O$ content of 13.0 wt % and a relative crystallinity of 85%) was added to 80 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 200 g of $Na_2SO_4$ were mixed evenly to produce an aqueous ion-containing solution. The aqueous solution was adjusted to a pH of 6.1 with oxalic acid (20 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 80 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.

(3) The acid liquid obtained from the acid chamber was added to an ion-exchange vessel, and the filter cake obtained in step (1) was ion-exchanged with the acid liquid at 30° C. for 30 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (20 wt %), and the resulting filtrate was adjusted to a pH of 6.1 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 35 A. The current intensity at the initial stage of the electrodialysis for the last run was 35 A. In this example, the weight ratio (g/kg) of oxalic acid to the molecular sieve starting material is 1.2.

Comparative Example 2

(1) 10 kg of NaY-molecular sieve (having a $Na_2O$ content of 13.0 wt % and a relative crystallinity of 85%) was added to 80 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 200 g of $Na_2SO_4$ were mixed evenly to produce an aqueous ion-containing solution. The aqueous solution was adjusted to a pH of 9 with aqueous ammonia (20 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 80 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.

(3) The acid liquid obtained from the acid chamber was added to an ion-exchange vessel, and the filter cake obtained in step (1) was ion-exchanged with the acid liquid at 30° C. for 30 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (20 wt %), and the resulting filtrate was adjusted to a pH of 10 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 32 A. The current intensity at the initial stage of the electrodialysis for the last run was 33 A.

Example 3

(1) 8 kg of ZSM-5 molecular sieve (having a $Na_2O$ content of 1.2 wt % and a relative crystallinity of 95%) was added to 100 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.
(2) The resulting filtrate and 500 g of $Na_2SO_4$ were mixed evenly to produce an aqueous ion-containing solution. The aqueous solution was adjusted to a pH of 4.62 with oxalic acid (20 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.
(3) The acid liquid obtained from the acid chamber was added to an ion-exchange vessel, and the filter cake obtained in step (1) was ion-exchanged with the acid liquid at 30° C. for 30 minutes.
(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 4.62 and filtered to produce a treatment liquid.
(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 42 A. The current intensity at the initial stage of the electrodialysis for the last run was 42 A.

In this example, the weight ratio (g/kg) of oxalic acid to the molecular sieve starting material is 0.93.

Comparative Example 3

(1) 8 kg of ZSM-5 molecular sieve (having a $Na_2O$ content of 1.2 wt % and a relative crystallinity of 95%) was added to 100 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.
(2) The resulting filtrate and 500 g of $Na_2SO_4$ were mixed evenly to produce an aqueous ion-containing solution. The aqueous solution was adjusted to a pH of 12 with aqueous ammonia (30 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.
(3) The acid liquid obtained from the acid chamber was added to an ion-exchange vessel, and the filter cake obtained in step (1) was ion-exchanged with the acid liquid at 30° C. for 30 minutes.
(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 12 and filtered to produce a treatment liquid.
(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 40 A. The current intensity at the initial stage of the electrodialysis for the last run was 39 A.

Example 4

(1) 50 kg of Beta-molecular sieve (having a $Na_2O$ content of 1.32 wt % and a relative crystallinity of 95%) was added to 650 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.
(2) The resulting filtrate and 2500 g of $Na_2SO_4$ were mixed evenly to produce an aqueous ion-containing solution. The aqueous solution was adjusted to a pH of 6.3 with oxalic acid (20 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 100 kg of deionized water, and to the storage tank of the electrode chamber was added 20 kg of an aqueous $Na_2SO_4$ solution (2 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 60V. The electrodialysis was run at 30° C. for 35 minutes.

(3) The acid liquid obtained from the acid chamber was added to an ion-exchange vessel, and the filter cake obtained in step (1) was ion-exchanged with the acid liquid at 30° C. for 25 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 6.3 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Other two batches of the "fresh" (i.e. not being ion-exchanged) molecular sieve were sent to the step (3). Three runs were performed in total. The current intensity at the initial stage of the electrodialysis for the first run was 48 A. The current intensity at the initial stage of the electrodialysis for the last run was 47 A. In this example, the weight ratio (g/kg) of oxalic acid to the molecular sieve starting material is 0.6.

Comparative Example 4

(1) 50 kg of Beta-molecular sieve (having a $Na_2O$ content of 1.32 wt % and a relative crystallinity of 95%) was added to 650 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 2500 g of $Na_2SO_4$ were mixed evenly to produce an aqueous ion-containing solution. The aqueous solution was adjusted to a pH of 11 with aqueous ammonia (30 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 100 kg of deionized water, and to the storage tank of the electrode chamber was added 20 kg of an aqueous $Na_2SO_4$ solution (2 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 60V. The electrodialysis was run at 30° C. for 35 minutes.

(3) The acid liquid obtained from the acid chamber was added to an ion-exchange vessel, and the filter cake obtained in step (1) was ion-exchanged with the acid liquid at 30° C. for 25 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 12 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Other two batches of the "fresh" (i.e. not being ion-exchanged) molecular sieve were sent to the step (3). Three runs were performed in total. The current intensity at the initial stage of the electrodialysis for the first run was 45 A. The current intensity at the initial stage of the electrodialysis for the last run was 44 A.

Example 5

(1) 10 kg of MCM-22-molecular sieve (having a $Na_2O$ content of 2.95 wt % and a relative crystallinity of 97%) was added to 230 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 3000 g of NaCl were mixed evenly to produce an aqueous ion-containing solution. The aqueous solution was adjusted to a pH of 5.8 with oxalic acid (20 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 100 kg of deionized water, and to the storage tank of the electrode chamber was added 30 kg of an aqueous NaOH solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 50V. The electrodialysis was run at 35° C. for 40 minutes.

(3) The acid liquid obtained from the acid chamber was added to an ion-exchange vessel, and the filter cake obtained in step (1) was ion-exchanged with the acid liquid at 40° C. for 30 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 5.8 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Other three batches of the "fresh" (i.e. not being ion-exchanged) molecular sieve were sent to the step (3). Four runs were performed in total. The current intensity at the initial stage of the electrodialysis for the first run was 40 A. The current intensity at the initial stage of the electrodialysis for the last run was 39 A. In this example, the weight ratio (g/kg) of oxalic acid to the molecular sieve starting material is 0.7.

Comparative Example 5

(1) 10 kg of MCM-22-molecular sieve (having a $Na_2O$ content of 2.95 wt % and a relative crystallinity of 97%) was added to 230 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.
(2) The resulting filtrate and 3000 g of NaCl were mixed evenly to produce an aqueous ion-containing solution. The aqueous solution was adjusted to a pH of 12 with aqueous ammonia (30 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 100 kg of deionized water, and to the storage tank of the electrode chamber was added 30 kg of an aqueous NaOH solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 50V. The electrodialysis was run at 35° C. for 40 minutes.
(3) The acid liquid obtained from the acid chamber was added to an ion-exchange vessel, and the filter cake obtained in step (1) was ion-exchanged with the acid liquid at 40° C. for 30 minutes.
(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 12 and filtered to produce a treatment liquid.
(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Other three batches of the "fresh" (i.e. not being ion-exchanged) molecular sieve were sent to the step (3). Four runs were performed in total. The current intensity at the initial stage of the electrodialysis for the first run was 38 A. The current intensity at the initial stage of the electrodialysis for the last run was 36 A.

Comparative Example 6

(1) 8 kg of ZSM-5 molecular sieve (having a $Na_2O$ content of 1.2 wt % and a relative crystallinity of 95%) was added to 100 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.
(2) The resulting filtrate and 500 g of $Na_2SO_4$ were mixed evenly to produce an aqueous ion-containing solution. The aqueous solution was adjusted to a pH of 4.81 with hydrochloric acid (10 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.
(3) The acid liquid obtained from the acid chamber was added to an ion-exchange vessel, and the filter cake obtained in step (1) was ion-exchanged with the acid liquid at 30° C. for 30 minutes.
(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 4.81 and filtered to produce a treatment liquid.
(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 25 A. The current intensity at the initial stage of the electrodialysis for the last run was 21 A.

Comparative Example 7

(1) 8 kg of ZSM-5 molecular sieve (having a $Na_2O$ content of 1.2 wt % and a relative crystallinity of 95%) was added to 100 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.
(2) The resulting filtrate and 500 g of $Na_2SO_4$ were mixed evenly to produce an aqueous ion-containing solution. The aqueous solution was adjusted to a pH of 5.01 with sulphuric acid (20 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.

(3) The acid liquid obtained from the acid chamber was added to an ion-exchange vessel, and the filter cake obtained in step (1) was ion-exchanged with the acid liquid at 30° C. for 30 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 5.01 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 28 A. The current intensity at the initial stage of the electrodialysis for the last run was 23 A.

Comparative Example 8

(1) 8 kg of ZSM-5 molecular sieve (having a $Na_2O$ content of 1.2 wt % and a relative crystallinity of 95%) was added to 100 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 500 g of $Na_2SO_4$ were mixed evenly to produce an aqueous ion-containing solution. The aqueous solution was adjusted to a pH of 5.45 with nitric acid (10 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.

(3) The acid liquid obtained from the acid chamber was added to an ion-exchange vessel, and the filter cake obtained in step (1) was ion-exchanged with the acid liquid at 30° C. for 30 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 5.45 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 27 A. The current intensity at the initial stage of the electrodialysis for the last run was 25 A.

Comparative Example 9

(1) 8 kg of ZSM-5 molecular sieve (having a $Na_2O$ content of 1.2 wt % and a relative crystallinity of 95%) was added to 100 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 500 g of $Na_2SO_4$ were mixed evenly to produce an aqueous ion-containing solution. The aqueous solution was adjusted to a pH of 5.53 with acetic acid (3 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.

(3) The acid liquid obtained from the acid chamber was added to an ion-exchange vessel, and the filter cake obtained in step (1) was ion-exchanged with the acid liquid at 30° C. for 30 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 5.53 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 29 A. The current intensity at the initial stage of the electrodialysis for the last run was 26 A.

Comparative Example 10

(1) 8 kg of ZSM-5 molecular sieve (having a $Na_2O$ content of 1.2 wt % and a relative crystallinity of 95%) was added to 100 kg of deionized water, and the resulting mixture was stirred evenly to produce a slurry. The slurry was filtered to produce a filtrate (the second liquid) and a filter cake (the second solid), wherein the weight ratio of the molecular sieve to water in the filter cake was 1:3.

(2) The resulting filtrate and 500 g of $Na_2SO_4$ were mixed evenly to produce an aqueous ion-containing solution. The aqueous solution was adjusted to a pH of 4.57 with formic acid (5 wt %) and then subjected to a solid-liquid separation. The resulting liquid phase was sent to the storage tank of the salt chamber of a bipolar membrane electrodialysis device. Meanwhile, to the storage tanks of the base chamber and the acid chamber of the bipolar membrane electrodialysis device were respectively added 50 kg of deionized water, and to the storage tank of the electrode chamber was added 20 kg of an aqueous $Na_2SO_4$ solution (3 wt %). The power of the circulation pump of the bipolar membrane electrodialysis device was switched on to start up the circulation pump. Once the circulation reached a normal state, the DC power between the anode and the cathode of the bipolar membrane electrodialysis device was initiated. The voltage was adjusted and controlled to 40V. The electrodialysis was run at 30° C. for 20 minutes.

(3) The acid liquid obtained from the acid chamber was added to an ion-exchange vessel, and the filter cake obtained in step (1) was ion-exchanged with the acid liquid at 30° C. for 30 minutes.

(4) The resulting molecular sieve slurry in the ion-exchange vessel was filtered to produce a filtrate (the first liquid) and a filter cake, wherein the weight ratio of the molecular sieve to water in the filter cake was 1:3. To the resulting filtrate was added aqueous ammonia (30 wt %), and the resulting filtrate was adjusted to a pH of 4.57 and filtered to produce a treatment liquid.

(5) The treatment liquid was sent to the storage tank of the salt chamber of the electrodialysis device, and subjected to the bipolar membrane electrodialysis as outlined above.

The molecular sieve was subjected to the ion-exchange for one time, and the resulting molecular sieve was taken out. Another batch of the "fresh" (i.e. not being ion-exchanged) molecular sieve was sent to the step (3). Two runs were performed in total.

The current intensity at the initial stage of the electrodialysis for the first run was 26 A. The current intensity at the initial stage of the electrodialysis for the last run was 20 A.

The results of the above examples were listed in Tables 1-3. Comparative Examples 1-5 were performed according to the disclosures of CN103768951A, Example 1-5 were performed according to the present invention. Comparative Examples 6-10 were performed according to the present invention except that no oxalic acid was used. It can be seen from the results that compared to other acids, the process of the present invention can achieve a higher initial current intensity, and compared to CN103768951A, the process of the present invention can not only achieve a higher initial current intensity, but also a higher current intensity even after 30 minutes. The above results can demonstrate the process of the present invention can achieve a lower energy consumption at the bipolar membrane electrodialysis step and a higher ion-exchange efficiency.

TABLE 1

| | Molecular sieve | Acid/Base | pH | pH | Current intensity (after 30 minutes) | Current intensity (after 30 minutes) |
|---|---|---|---|---|---|---|
| Example 1 | REUSY | Oxalic acid | 5.6 | 5.6 | 28 | 27 |
| Comparative Example 1 | REUSY | Aqueous ammonia | 12.5 | 11 | 14 | 13 |

TABLE 2

| | Molecular sieve | Acid/Base | pH | pH | Current intensity (initial) | Current intensity (initial) |
|---|---|---|---|---|---|---|
| Example 1 | REUSY | Oxalic acid | 5.6 | 5.6 | 44 | 44 |
| Comparative Example 1 | REUSY | Aqueous ammonia | 12.5 | 11 | 42 | 42 |
| Example 2 | Nay | Oxalic acid | 6.1 | 6.1 | 35 | 35 |
| Comparative Example 2 | Nay | Aqueous ammonia | 9 | 10 | 32 | 33 |
| Example 3 | ZSM-5 | Oxalic acid | 4.62 | 4.62 | 42 | 42 |
| Comparative Example 3 | ZSM-5 | Aqueous ammonia | 12 | 12 | 40 | 39 |
| Example 4 | Beta | Oxalic acid | 6.3 | 6.3 | 48 | 47 |
| Comparative Example 4 | Beta | Aqueous ammonia | 11 | 12 | 45 | 44 |
| Example 5 | MCM-22 | Oxalic acid | 5.8 | 5.8 | 40 | 39 |
| Comparative Example 5 | MCM-22 | Aqueous ammonia | 12 | 12 | 38 | 36 |

TABLE 3

| | Molecular sieve | Acid/Base | pH | pH | Current intensity (initial) | Current intensity (initial) |
|---|---|---|---|---|---|---|
| Example 3 | ZSM-5 | Oxalic acid | 4.62 | 4.62 | 42 | 42 |
| Comparative Example 6 | ZSM-5 | Hydrochloric acid | 4.81 | 4.81 | 25 | 21 |
| Comparative Example 7 | ZSM-5 | Sulphuric acid | 5.01 | 5.01 | 28 | 23 |
| Comparative Example 8 | ZSM-5 | Nitric acid | 5.45 | 5.45 | 27 | 25 |
| Comparative Example 9 | ZSM-5 | Acetic acid | 5.53 | 5.53 | 29 | 26 |
| Comparative Example 10 | ZSM-5 | Formic acid | 4.57 | 4.57 | 26 | 20 |

The invention claimed is:

1. A process for ion-exchanging an exchangeable-ion containing solid material, comprising:
    a bipolar membrane electrodialysis step, which comprises subjecting an aqueous ion-containing solution to bipolar membrane electrodialysis to produce an acid liquid;
    an ion-exchange step, which comprises contacting the exchangeable-ion containing solid material with the acid liquid and conducting the ion-exchange to produce a slurry containing the ion-exchanged solid material;
    a solid-liquid separation step, which comprises subjecting the slurry containing the ion-exchanged solid material to a solid-liquid separation to produce a solid phase and a liquid phase, adjusting the liquid phase to a pH of 4-6.5, and subjecting the pH-adjusted liquid phase to a solid-liquid separation to produce a treatment liquid; and adding oxalic acid to one of more of the following:

the aqueous ion-containing solution or the acid liquid prior to the ion-exchange step, the mixture of the exchangeable-ion containing solid material and the acid liquid during the ion-exchange step, the slurry containing the ion-exchanged solid material obtained from the ion-exchange step, and the liquid phase obtained from the solid-liquid separation step, wherein the aqueous ion-containing solution has an anion concentration or a cation concentration of 0.01-10 mol/L.

2. The process of claim 1, wherein the aqueous ion-containing solution is an aqueous ion-containing solution obtained by a process comprising washing the exchangeable-ion containing solid material with water; adding an ionic compound and oxalic acid to the resulting water-washing liquid; adjusting the resulting mixture to a pH of 4-6.5; and filtering the pH-adjusted mixture.

3. The process of claim 2, wherein the ionic compound is one or more selected from the group consisting of sodium sulphate, sodium nitrate, sodium phosphate, sodium hydrogen phosphate, sodium dihydrogen phosphate, potassium nitrate, potassium phosphate, potassium hydrogen phosphate, potassium dihydrogen phosphate, sodium formate, potassium formate, and quaternary ammonium compounds.

4. The process of claim 1, wherein the exchangeable ion in the exchangeable-ion containing solid material comprises one or more selected from the group consisting of $Ca^{2+}$, $Mg^{2+}$, $Fe^{3+}$, $Al^{3+}$, $Si^{4+}$, and rare earth metal ions.

5. The process of claim 1, wherein the aqueous ion-containing solution comprises the treatment liquid obtained from the solid-liquid separation step.

6. The process of claim 1, wherein, relative to the weight of the exchangeable-ion containing solid material, a total amount of added oxalic acid is 0.1-10 g/kg.

7. The process of claim 1, wherein the liquid phase obtained from the solid-liquid separation step contains oxalic acid.

8. The process of claim 1, wherein the exchangeable-ion containing solid material is a molecular sieve.

9. The process of claim 1, wherein bipolar membrane electrodialysis is conducted in a bipolar membrane electrodialysis device, the bipolar membrane electrodialysis device comprises an anode, a cathode, at least two bipolar membranes disposed between the anode and the cathode, and at least one cation exchange membrane and at least one anion exchange membrane disposed between each of the at least two bipolar membranes.

10. The process of claim 1, wherein the exchangeable-ion containing solid material is selected from the group consisting of ZSM 5 molecular sieve, REUSY molecular sieve, NaY molecular sieve, Beta molecular sieve, and MCM-22 molecular sieve.

11. The process of claim 10, wherein the exchangeable-ion containing solid material is a molecular sieve having a $Na_2O$ content of 1-15 wt %.

12. The process of claim 1, wherein the exchangeable-ion containing solid material is a molecular sieve having a $Na_2O$ content of 0.1-20 wt %.

13. The process of claim 1, wherein the exchangeable-ion containing solid material is a molecular sieve having a relative crystallinity of 50-99%.

14. The process of claim 13, wherein the exchangeable-ion containing solid material is a molecular sieve having a relative crystallinity of 58%-97%.

15. The process of claim 1, wherein the liquid phase is adjusted with a basic substance to a pH of 4-6.5.

16. The process of claim 1, wherein the aqueous ion-containing solution has an anion concentration or a cation concentration of 0.01-10 mol/L.

17. A process for ion-exchanging an exchangeable-ion containing solid material, comprising:

(1) mixing an exchangeable-ion containing solid material and water to produce a first slurry;

(2) subjecting the first slurry to a solid-liquid separation to produce a second liquid and a second solid;

(3) contacting the second liquid with an ionic compound and oxalic acid to produce an aqueous ion-containing solution and controlling the aqueous ion-containing solution to a pH of 4-6.5, and then subjecting the pH-controlled solution to a solid-liquid separation to produce a treatment liquid, and subjecting the resulting treatment liquid to bipolar membrane electrodialysis to produce an acid liquid;

(4) ion-exchanging at least a part of the second solid with the resulting acid liquid in an ion-exchange vessel to produce a slurry containing the ion-exchanged solid material, then subjecting the resulting slurry containing the ion-exchanged solid material to a solid-liquid separation to produce a first liquid and a first solid, and treating the first solid to produce a finished product or sending the first solid back to the ion-exchange vessel for further treatment; and (5) adjusting the first liquid with a basic substance to a pH of 4-6.5, then subjecting the pH-adjusted first liquid to a solid-liquid separation to produce second treatment liquid, and subjecting the second treatment liquid to bipolar membrane electrodialysis to produce a second acid liquid.

18. The process of claim 17, wherein an amount of oxalic acid is 0.1-10 g/kg relative to the weight of the exchangeable-ion containing solid material.

* * * * *